US005836574A

United States Patent [19]

Park

[11] Patent Number: 5,836,574

[45] Date of Patent: Nov. 17, 1998

[54] CLAMPING DEVICE OF MACHINE TOOL

[76] Inventor: Sung-Bu Park, #401, 101dong Pungrim Apt., 13, Kwankyo-Dong, Nam-Ku, Incheon, Rep. of Korea

[21] Appl. No.: 832,022

[22] Filed: Apr. 2, 1997

[30] Foreign Application Priority Data

| | | | |
|---|---|---|---|
| Apr. 4, 1996 | [KR] | Rep. of Korea | 1996-7172 |
| Aug. 11, 1996 | [KR] | Rep. of Korea | 1996-38987 |
| Apr. 2, 1997 | [KR] | Rep. of Korea | 1997-1619 |
| Apr. 2, 1997 | [KR] | Rep. of Korea | 1997-1620 |

[51] Int. Cl.$^{6}$ ..... B23Q 3/00

[52] U.S. Cl. ..... 269/93

[58] Field of Search ..... 269/91–94, 239, 269/99–100, 900

[56] References Cited

U.S. PATENT DOCUMENTS

| | | | |
|---|---|---|---|
| 1,801,222 | 4/1931 | Cayo | 269/93 |
| 4,526,354 | 7/1985 | Mannes | 269/93 |
| 5,002,265 | 3/1991 | Burt et al. | 269/93 |

*Primary Examiner*—Robert C. Watson

*Attorney, Agent, or Firm*—Thomason and Moser

[57] ABSTRACT

In a clamping device of a machine tool, a washer member moves slidingly on a pair of bodies along the longitudinal groove and further advances toward a fastening bolt. A fastening nut is assembled to the fastening bolt to clamp the workpiece. Moreover, a lower surface of the other end of clamping member is supported by the sloped portion of a height adjustment member.

8 Claims, 9 Drawing Sheets

CLAMPING DEVICE OF MACHINE TOOL

BACKGROUND OF THE INVENTION

1. Field of the Invention

The present invention relates to clamping device of machine tool. More specifically, the invention relates to a light weight clamping device of machine tool which can clamp a workpiece slopingly and provides a washer member to be moved on the body of the clamping member slidingly.

2. Description of the Prior Art

A clamping device of machine tool is generally used as a means for holding down a workpiece on the table of machine tool. In the clamping device, a head of a fastening bolt is inserted in a groove formed at the table and a fastening nut is assembled to a protruding portion of the fastening bolt through a slot of a clamping member. One end of clamping member presses workpiece in order to fasten workpiece on a table of a machine tool.

A conventional clamping device, shown in FIG. 10, comprises a fastening bolt 57 inserted in a T-groove 55 formed at a table 50 of a machine tool, and a clamping member 60 having a penetrating opening 68 for receiving the fastening bolt 57. The clamping member 60 is comprised of a U-band as viewed from above. Under the rear lower end of the clamping member 60 there is a block 70 for supporting the clamping member 60.

In the above clamping device of machine tool, firstly, the head 57H of the fastening bolt 57 is inserted into the T-groove 55 of the table 50 on which a workpiece 300 is placed, and the fastening bolt 57 is moved near to the workpiece 300. The clamping member 60 is aligned to the upright extending bolt 57 with a penetrating opening 68. Conversely, under the other end 63E of the clamping member 60 which is opposite the end 60P pressing the workpiece 300, there is the block 70. In respect to the variation in the height of workpiece, the rear lower end 63E of the clamping member 60 is supported by the first surface 71 or the second surface 73 of the block 70. Next, the fastening nut 58 is turned to affix the clamping member 60, and the lower surface of the fastening nut 58 presses the upper surface 61 of the clamping member 60.

Since the conventional clamping device is made of steel material, the clamping device is heavy causing inconvenience to move it. Besides, there is some inconvenience for handling the clamping device because of its configuration, which could possibly result in an accident.

More, to attain the firm fastening of the clamping member 60 the fastening nut 58 is continually turned, but the greater force applied to the upper surface 61 of the clamping member may bring possibly damage the upper surface 1. Moreover, both ends 60L,60R of the clamping member spread further apart from each other due to the greater force applied on the upper surface of the clamping member, thereby preventing the workpiece from being fixed.

Further, if there is a slight difference between the height of the workpiece and that of the block, the rear lower end 63E of the clamping member can not be in contact evenly with the overall surface of either the first surface or second surface in order for the workpiece to be pressed properly, thereby resulting the unstable clamping of the workpiece.

SUMMARY OF THE INVENTION

The present invention is intended to overcome the above mentioned and numerous other disadvantages and deficiencies of the prior art. Therefore, it is an object of the present invention to provide a clamping device of machine tool which has light weight and high rigidity for fixing a large workpiece on a work table.

It is another object of the present invention to provide a clamping device of machine tool which prevents damage of the clamping member due to large turning force of the fastening bolt.

It is another object of the present invention to provide a clamping device of machine tool which can stably clamp the workpiece even though the workpiece can not be clamped evenly and can be used irrespective of the height of the workpiece.

In order to achieve the above objects of the present invention, there is provided a clamping device of machine tool comprising:

a fastening bolt, of which a head portion is inserted in a groove formed in a table of the machine tool, and of which an upright extending free end is threadedly coupled to a fastening nut;

a clamping member having a pair of bodies longitudinally extended, and a reinforcer disposed between the bodies with a space though which the fastening bolt passes, and the bodies having a longitudinal groove along a the wall, respectively; and a washer member disposed on the bodies and having a slot at the center portion of the washer member for receiving the fastening bolt, the fastening nut disposed on the washer member, and the washer member slidingly moving in the longitudinal direction of the bodies with a guidance of the groove of the clamping member.

The clamping device further includes a height adjustment member supporting the free end of clamping member opposite the pressing portion of the workpiece and for adjusting the height of the clamping member in respect to the workpiece.

Further, the height adjustment member comprises a base placed on the table, a column uprightly extending from the base and having a thread portion therearound, and a supporter threadedly coupled with said column and having a sloped portion in contact with said free end of the clamping member.

Moreover, the slot of the washer member is partially cut away for providing access to the circumference of the fastening bolt.

BRIEF DESCRIPTION OF THE DRAWINGS

The present invention may be better understood and its numerous objects and advantages will be more apparent to those skilled in the art by reference to the accompanying drawings in which.

DETAILED DESCRIPTION OF THE PREFERRED EMBODIMENT

The preferred embodiment of this invention will be described in detail with reference to the accompanying drawings.

Hereafter, components which are the same as that of the prior art are designated by the same numerals. Thus, no detailed explanation of those components will be provided.

FIGS. 1 through 9 show a clamping device according to the present invention.

Figure 1:
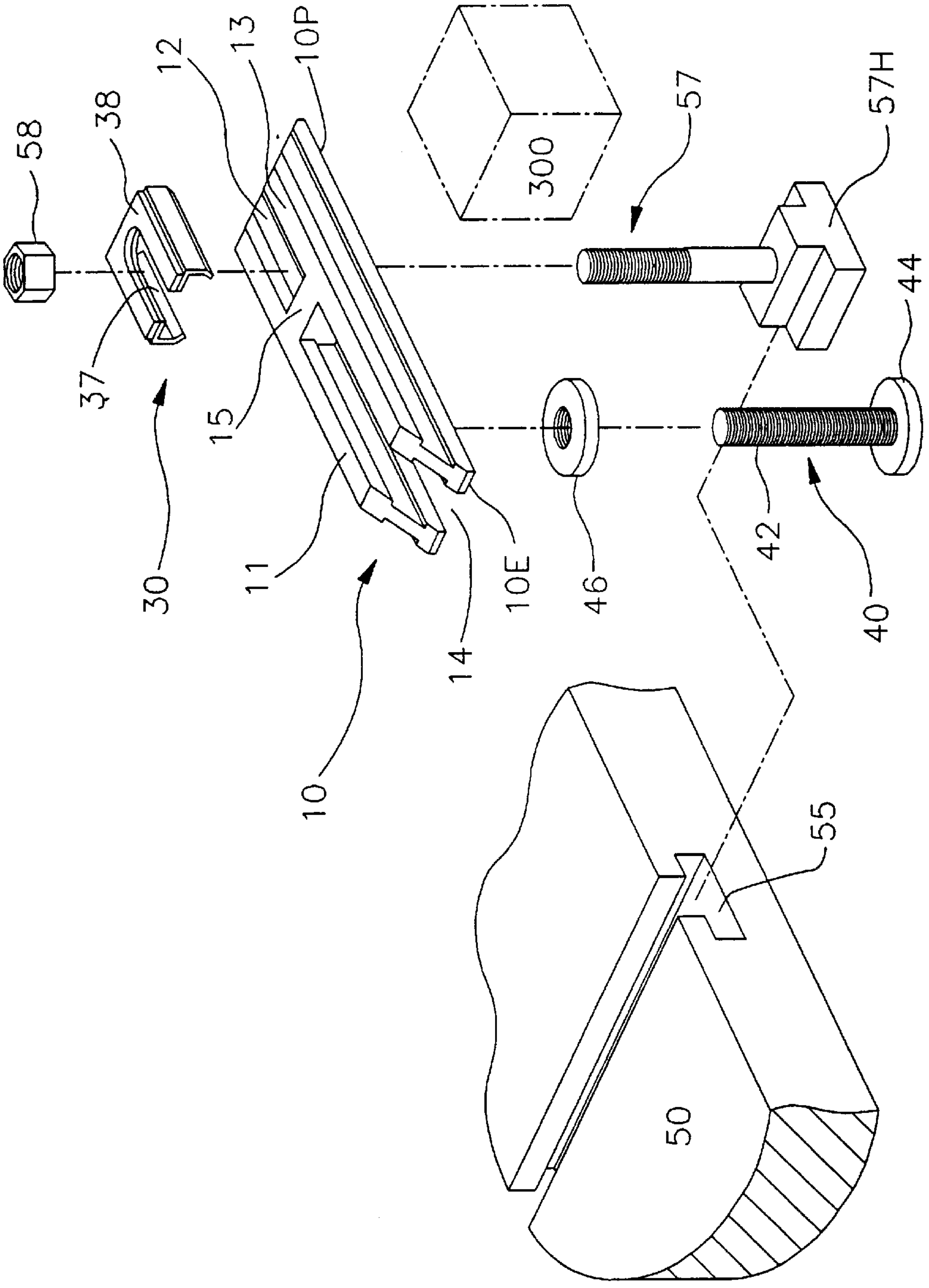
FIG. 1 is an exposed perspective view of a clamping device of machine tool illustrated as a first embodiment according to the present invention.

A clamping device of a machine tool is illustrated in FIG. 1 as a first embodiment. The clamping device is composed of a fastening bolt 57 with a T-shaped head 57H disposed in a T-shaped groove 55 formed in the table 50 of a machine tool, a clamping member 10 provided with a penetrating opening 12 through which the fastening bolt 57 is penetrated, and a washer member 30 slidably mounted on the clamping member 10.

The clamping member 10 comprises a pair of bodies 11,13 extending in a longitudinal manner, and a reinforcer 15 connecting the bodies 11,13, by which the penetrating openings 12,14 are created. Accordingly the areas restricted within these elements 11,12,15 are called as penetrating openings 12,14. Each body 11,13 further has inner and outer grooves 17,18 ( FIG. 2 ) on respective side walls in a longitudinal direction, thereby making the body 11,13 light. Moreover, the washer member 30 which will be illustrated later moves smoothly along the outer groove 18. Furthermore, the body 11,13 and the reinforcer 15 which constitute the clamping member 10 are made of an aluminum alloy, so that the weight of the clamping member 10 is less. The reinforcer 15 is integrally connected to the middle portion of each body 11,13, which generates the penetrating openings 12,14. The fastening bolt 57 is passed through the first penetrating opening 12, thereby securing the clamping member 10 by the fastening nut 58 assembled with the bolt 57. In a similar way, a bolt 42 functioning as a height adjustment member 40, which will be illustrated later, is passed through the second penetrating opening 14.

Figure 2:
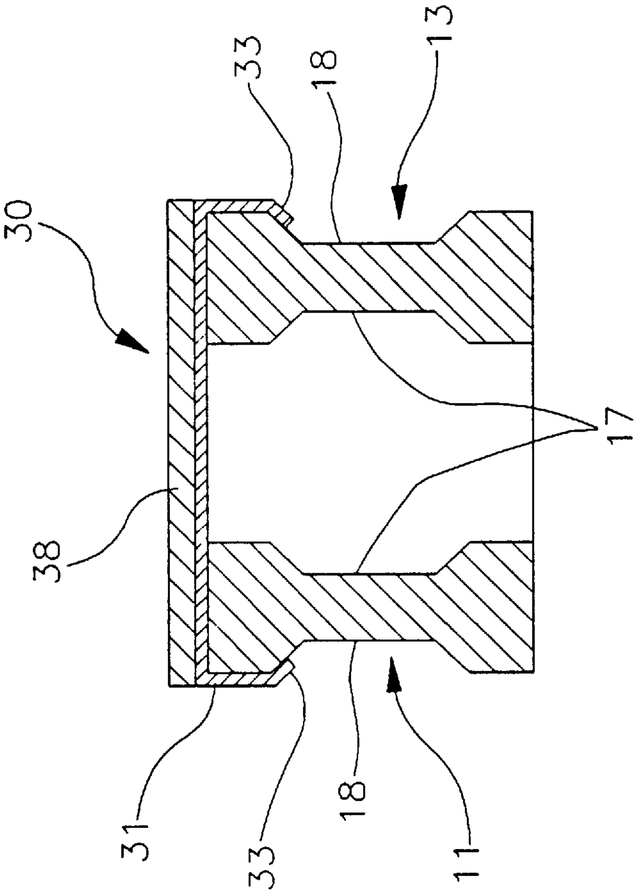
FIG. 2 is a traverse crosssectional view of washer member disposed on the upper portion of a clamping member shown in FIG. 1.

The washer member 30, as shown in FIGS. 1 and 2, comprises a reinforcing plate 38 for supporting the fastening nut 58, and a guiding plate 31 provided in contact under the bottom portion of the reinforcing plate 38 for allowing smooth movement of the reinforcing plate 38 on each body 11,13. The guiding plate 31 is bent as shown in FIG. 2 and respective bent portions 33 provided at both ends of the guiding plate 31 are placed in the corresponding outer groove 18 of each body 11,13. The guiding plate 31 is made of an aluminum alloy which is the same as that of the body 11,13, while the reinforcing plate 38 is made of a steel plate to endure the fastening force of the nut 58. At the center of respective reinforcing plate 38 and guiding plate 31 there is a slot 37 which is open in one end thereof. Using above slot 37 the washer member 30 is moved toward the bolt 57, and next the nut 58 assembled with the bolt 57 is pressed against the reinforcing plate 38, thereby fastening the clamping member 10.

Figure 3:
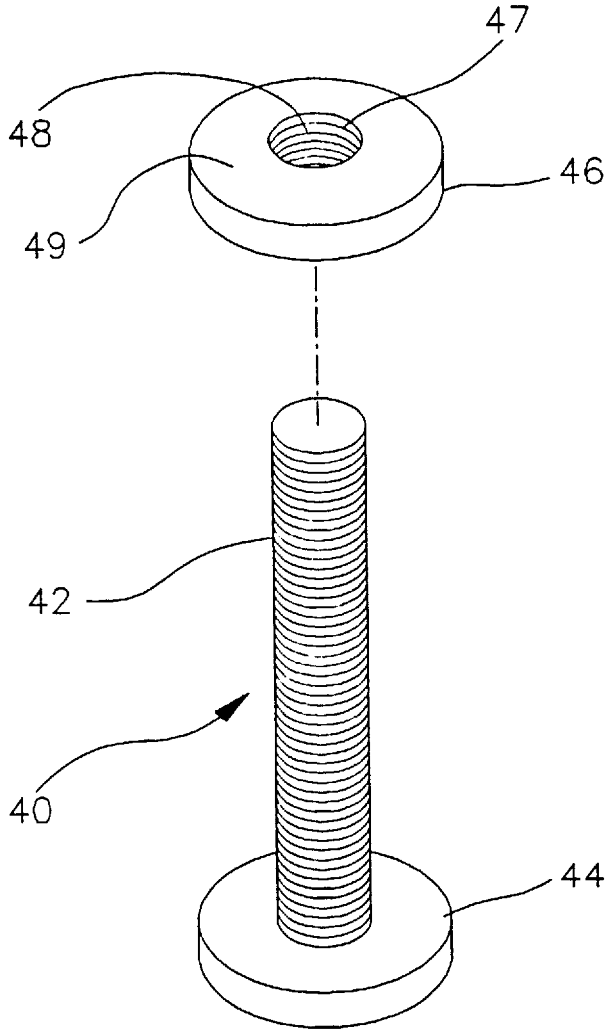
FIG. 3 is an enlarged exposed perspective view of height control member shown in FIG. 1.
Figure 4:
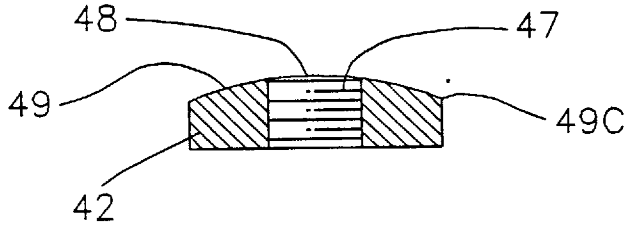
FIG. 4 is an enlarged traverse crosssectional view of supporting member shown in FIG. 3.

The clamping device of a machine tool further has a height adjustment member 40. The height adjustment member 40, as shown in FIG. 3, comprises a bolt 42, a head 44 threadedly coupled with the lower portion of the bolt 42, and a supporting member 46 threadedly assembled with the upper portion of the bolt 42. At the center of the supporting member 46 there is a coupling opening 48 for being threaded to the bolt 42. The supporting member 46 further has a sloped portion 49 at the upper surface of the member 46 as shown in FIG. 4. The sloped portion 49 is formed with a downward slope from the top of the thread portion 47 ( or the circumference of the coupling opening 48 ) toward the outer circumferential portion 49C of the sloped portion 49.

Figure 5:
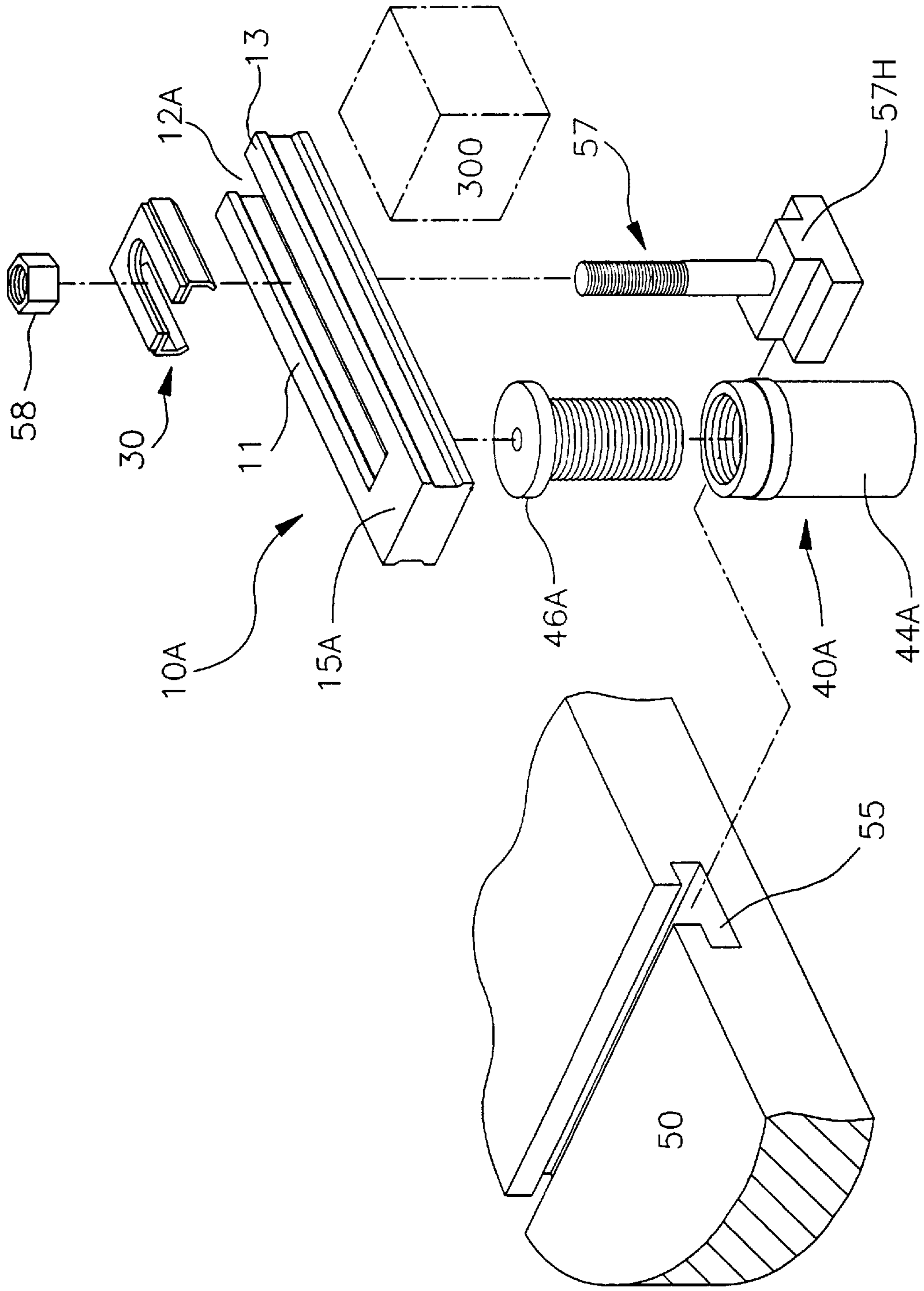
FIG. 5 is an exposed perspective view of a clamping device of machine tool illustrated as a second embodiment according to the present invention.
Figure 6:
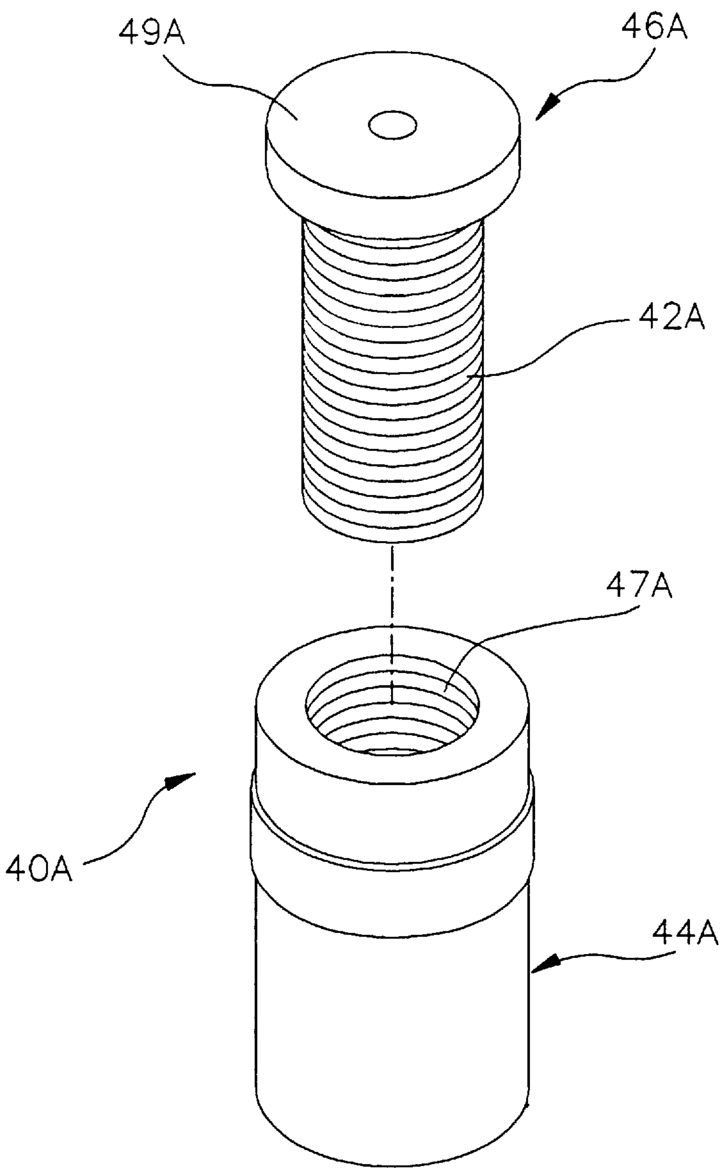
FIG. 6 is an enlarged exposed perspective view of height control member shown in FIG. 5.

FIG. 5 illustrates a second embodiment of the clamping device. The reinforcer 15A is integrally formed with the body 11,13 at one respective end of each body 11,13 or the end opposite to the portion holding down the workpiece 300. The clamp member 10A has only the first penetrating opening 12A, through which the fastening bolt 57 is passed to secure the clamp member 10A. Under the reinforcer 15A there is a height adjustment member 40A for supporting the reinforcer 15A and controlling the height of the clamp member 10A in respect of the table 50. The height adjustment member 40A, as shown in FIG. 6, comprises a hollow body 44A having a thread portion 47A thereinside, and a supporting member 46A threadedly connected to the body 44A. The supporting member 46A is comprised of a flat supporting plate 49A for supporting the reinforcer 15A, and a bolt 42A extended vertically from the lower surface of the supporting plate 49A.

Figure 7:
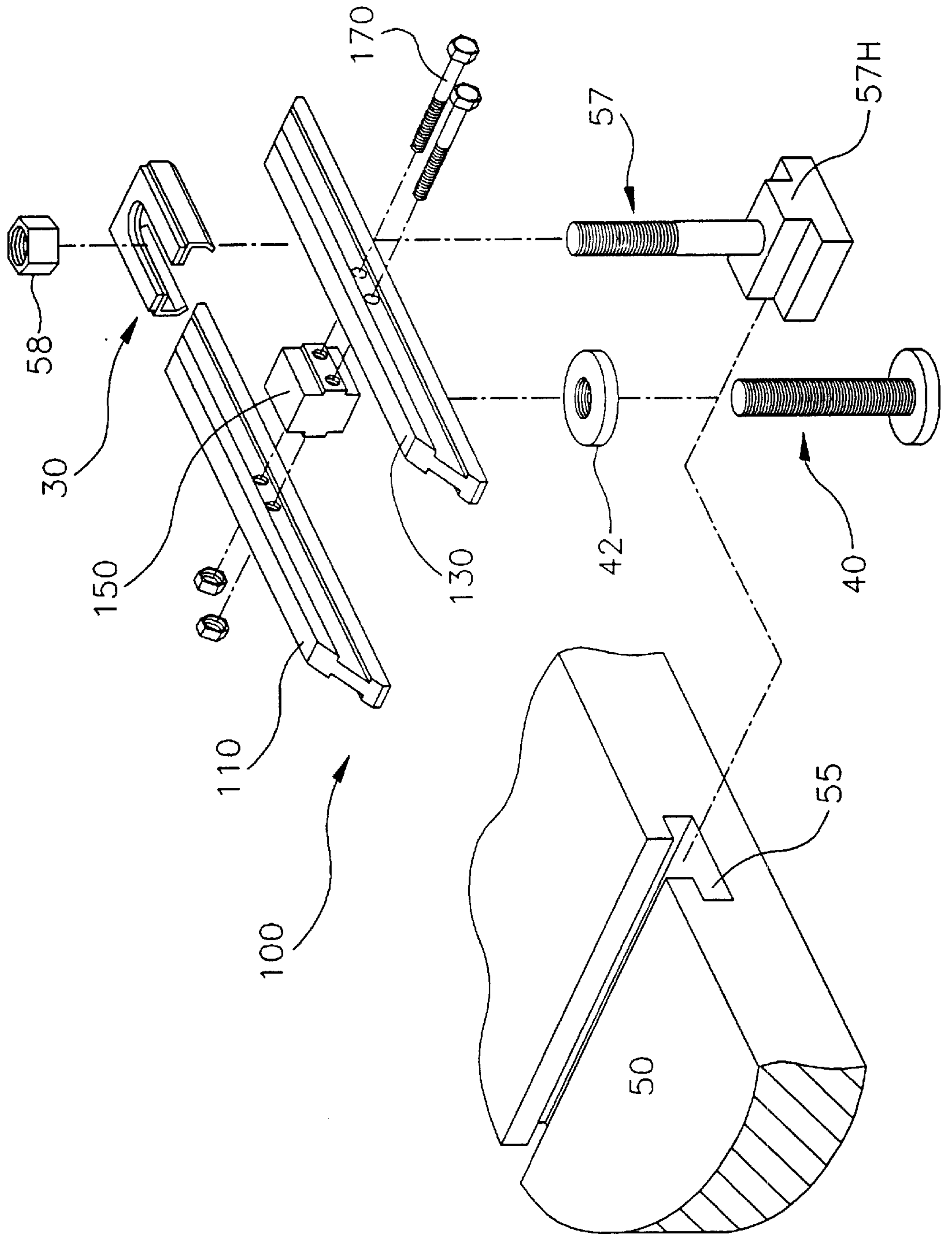
FIG. 7 is an exposed perspective view of a clamping device of machine tool illustrated as a third embodiment according to the present invention.

FIG. 7 shows a third embodiment of the clamping device. The clamping member 100 is manufactured into the split type, which is the modified embodiment from the clamping member 10 having each body 11,13 and the reinforcer 15 connected in an integral manner as illustrated in FIG. 1. The clamping member 100 comprises a separate pair of bodies 110,130 which are longitudinally extended, and a reinforcer 150 which connects the middle portion of each of the bodies 110,130 by bolts 170.

Figure 8:
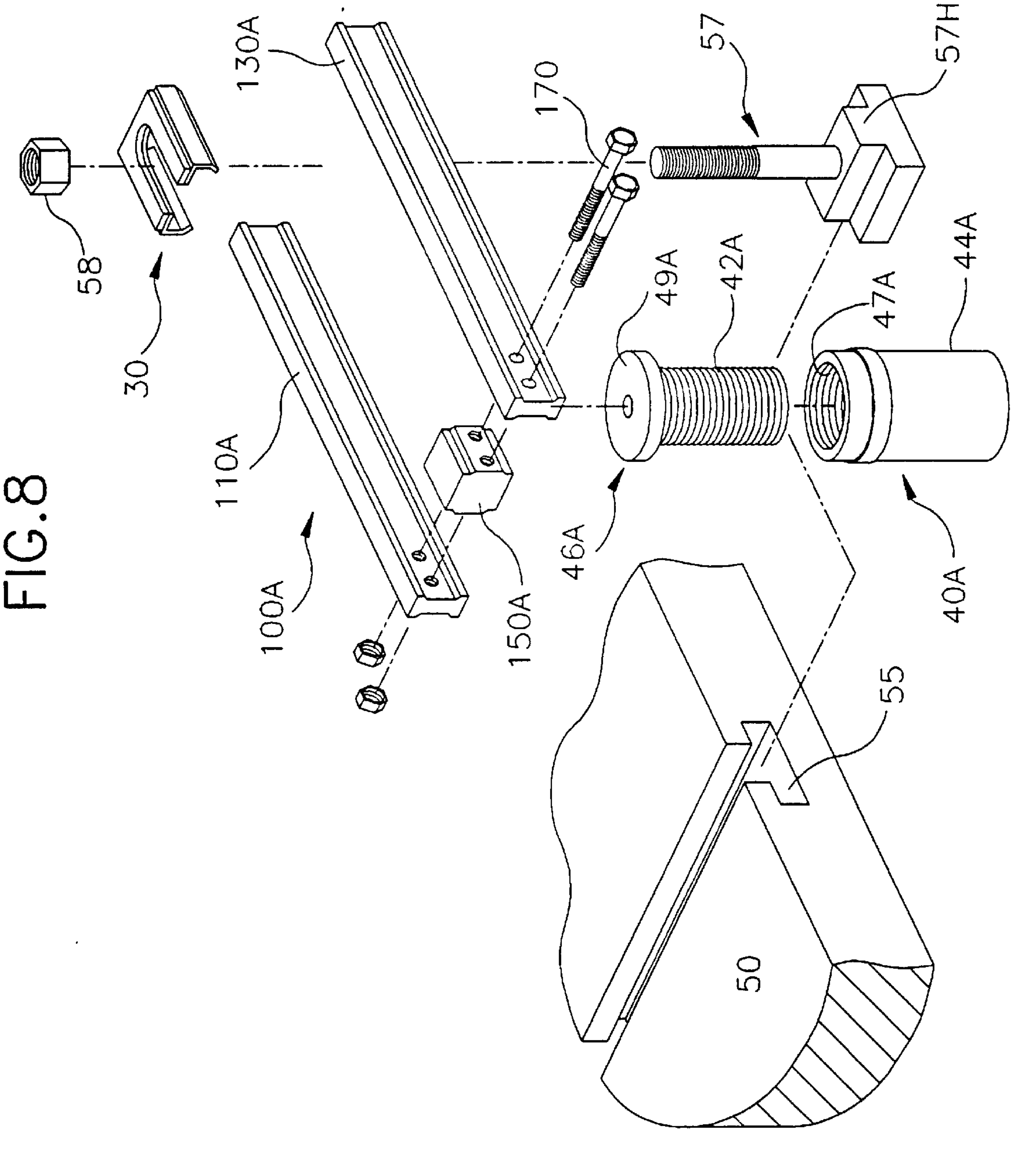
FIG. 8 is an exposed perspective view of a clamping device of machine tool illustrated as a fourth embodiment according to the present invention.

FIG. 8 shows a fourth embodiment of the clamping device. This is the modification of the second embodiment as illustrated in FIG. 5. The clamping member 100A comprises a separate pair of bodies 110A,130A which are longitudinally extended, and a reinforcer 150A which connects the end portions, or the end portions opposite to the portion pressing the workpiece, of each of the bodies 110, 130 by bolts 170.

Hereafter an operation of clamping device of the present invention will be described by employing the first embodiment.

The head 57H of the fastening bolt 57 is inserted in the T-groove 55 of the table 50 on which the workpiece 300 to be machined is placed, and the fastening bolt 57 is further moved near to the workpiece 300. The clamping member 10 is so arranged that the fastening bolt 57 extruded upright from the table 50 is penetrated through the second penetrating opening 12 of the clamping member 10. On the other hand, under the other end 10E of the clamping member 10 which is arranged opposite to the one end 10P of the clamping member 10 pressing the workpiece 300 there is a height adjustment member 40. The head 44 of the height adjustment member 40 is placed on the table 50, and the supporting member 46 is threaded along the bolt 42 extended upright from the head 44 so that the other end 10E of the clamping member 10 is supported by contact with the sloped portion 49 of the supporting member 46.

Figure 9:
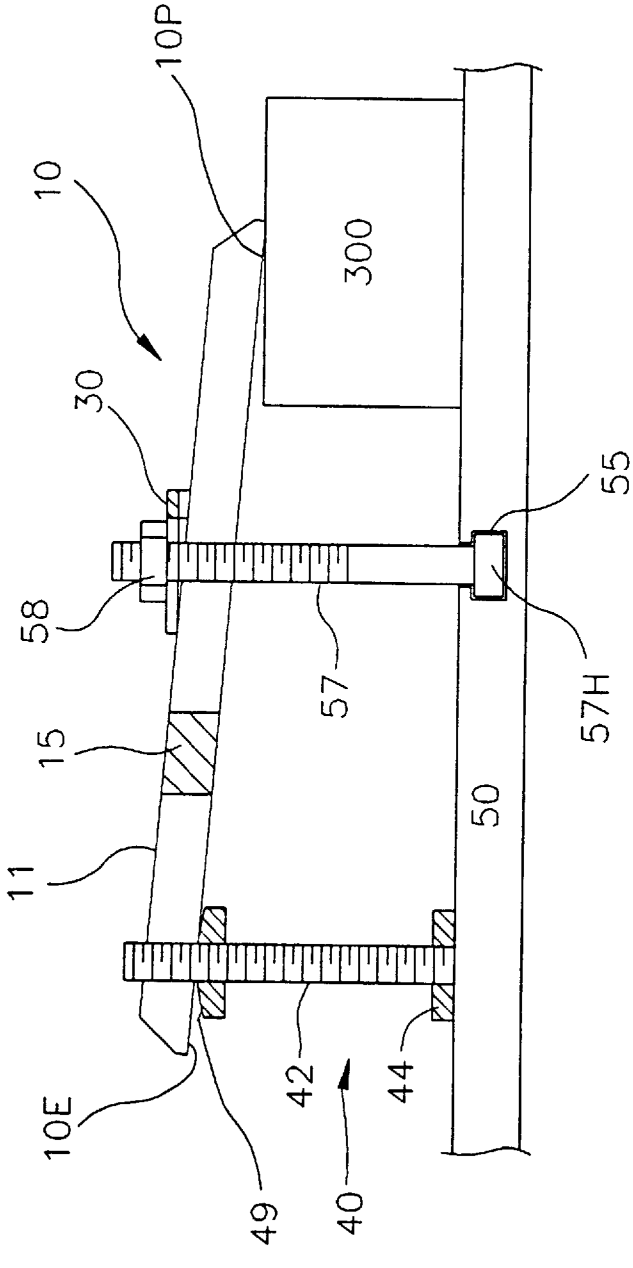
FIG. 9 is a side crosssectional view showing an operation of a clamping device shown in FIG. 1.
Figure 10:
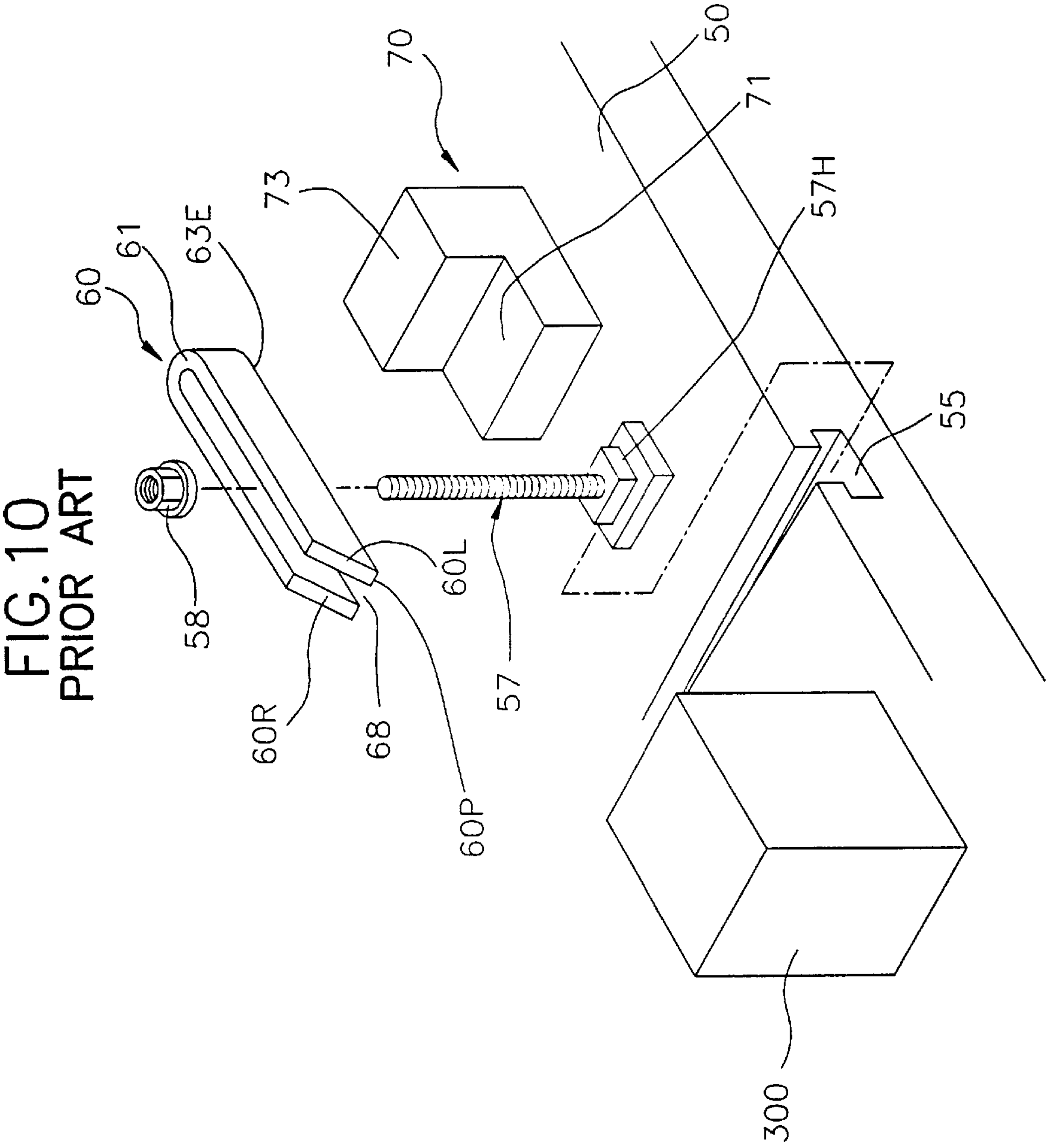
FIG. 10 PRIOR ART
FIG. 10 is an exposed perspective view of a clamping device of machine tool according to a prior art.

Next, the washer member 30 is slidingly moved along the body 11,13 toward the fastening bolt 57, and the open ended slot 37 of the washer member 30 encloses the circumference of the fastening bolt 57. The fastening nut 58 is threaded and the lower surface of the nut 58 makes contacts with the reinforcing plate 38 of the washer member 30. After the temporary fastening of the clamping member 10, the supporting member 46 of the height adjustment member 40 is moved up-and-down to cause the workpiece to be fastened in a horizontal manner. As shown in FIG. 9, though the coplanar level of the clamping member 10 in respect to the workpiece 300 could not be maintained, the lower surface of the other end 10E of the clamping member 10 is in contact with a certain surface of the sloped portion 49, and the clamping member 10 is slopedly positioned so that one end 10P of the clamping member 10 presses the workpiece 300. After the height of the clamping member 10 in respect to the table is adjusted, the fastening nut 58 is further threaded and the workpiece is firmly positioned.

The above operation can be adapted to respective operations of the embodiments 2,3, and 4 without much great variation. Thus, no detailed explanation of the embodiments 2,3, and 4 will be provided.

As set forth hereinabove, since the groove is longitudinally provided at both side wall of each body constituting the clamping member and each body is made of aluminum alloy, the weight of the clamping member is decreased. Further, for convenience in handing the clamping member when carrying it, the clamping member is easily clamped. There is no worry about dropping of the clamping member.

Moreover, the washer member is slidingly moved along the longitudinal extending groove and thus wherever workpiece is placed the clamping member is easily installed in respect to the workpiece. Moreover, as the reinforcing plate of the washer member is made of steel plate, the washer member can endure the torque generated by the fastening bolt.

On the other hand, since the supporting member of the height adjustment member is formed in a sloped manner, workpiece can be firmly clamped even if the clamping member does not maintain the even position in respect to workpiece.

What is claimed is:

1. A clamping device of machine tool for holding down a workpiece placed on a table of a machine tool, said clamping device comprising:

a fastening bolt, of which a head portion is inserted in a groove formed in said table, and of which an upright extending free end is threadedly coupled to a fastening nut;

a clamping member having a pair of bodies longitudinally extended, and a reinforcer disposed between said bodies with a space though which said fastening bolt passes, and said bodies having a longitudinal groove along a side wall, respectively; and a washer member disposed on said bodies and having a slot at the center portion of said washer member for receiving said fastening bolt, said fastening nut disposed on said washer member, and said washer member slidingly moving in the longitudinal direction of said bodies with a guidance of said groove of said clamping member.

2. The clamping device of machine tool of claim 1 wherein said clamping device further includes a height adjustment member supporting the free end of clamping member opposite the pressing portion of said workpiece and for adjusting the height of said clamping member in respect to said workpiece.

3. The clamping device of machine tool of claim 1 wherein said slot of the washer member is partially cut away for providing access to the circumference of said fastening bolt.

4. The clamping device of machine tool of claim 1 wherein said clamping member is made of an aluminum alloy.

5. The clamping device of machine tool of claim 1 wherein said washer member has a guiding plate being movable along said groove of said clamping member, and a reinforcing plate assembled in contact with said guiding plate and said fastening nut being placed on said upper surface of said reinforcing plate.

6. The clamping device of machine tool of claim 5 wherein said reinforcing plate is made of steel and said guiding plate is made of an aluminum alloy.

7. The clamping device of machine tool of claim 2 wherein said height adjustment member comprises a base placed on said table, a column uprightly extending from said base and having a thread portion therearound, and a supporter threadedly coupled with said column and having a sloped portion in contact with said free end of said clamping member.

8. The clamping device of machine tool of claim 7 wherein said column is inserted through the center of said supporter and the peripheral portion of said center of said supporter is downwardly sloped to the peripheral portion of said supporter.

* * * * *